Oct. 31, 1939.   C. H. WILLS   2,177,853
COMPOSITION OF MATTER AND METHOD OF MAKING THE SAME
Filed Aug. 9, 1938

INVENTOR
CHILD HAROLD WILLS
BY
Harness, Dind, Patee & Harris
ATTORNEYS.

UNITED STATES PATENT OFFICE 2,177,853

COMPOSITION OF MATTER AND METHOD OF MAKING THE SAME

Child Harold Wills, Grosse Pointe Farms, Mich., assignor to Chrysler Corporation, Highland Park, Mich., a corporation of Delaware Application August 9, 1938, Serial No. 223,906

8 Claims. (Cl. 75—22)

This invention relates to improvements in articles of the class which are formed by compression of powdered or finely divided materials and to the method of making the same.

More particularly, the invention relates to the provision of improvements in articles comprising compressed and sintered powdered metal structures.

One of the main objects of the invention is the provision of an improved lubricating agent in the mass of powdered or finely divided materials from which articles of this kind are formed by compression which facilitates movements of the particles with respect to each other during the compression operation and which remains in the finished product in such a state that it enhances the frictional characteristics thereof.

Other objects of the invention are to provide a lubricant of this character which, though comprising only a relatively small proportion of the mass of powdered materials from which compressed articles are formed, serves as a vehicle to promote the flowing-like action of the particles during the compression thereof to a desired shape; to provide a mixture of powdered materials which under compression become so relatively oriented with respect to each other as to facilitate the attainment of uniform density and strength throughout articles of substantially large sizes.

Other objects of the invention are to provide improved porous bearing structures which are of substantially uniform strength and density throughout their entirety; to provide structures of this character which have an evenly distributed porosity and capacity for absorbing liquid lubricant; to provide an improved dry lubricating agent in porous metal bearing structures, to facilitate the flowing of particles of finely divided metal relative to each other, to lubricate the surfaces of the parts of the die in which compression takes place and which remains in the finished bearing as a dry lubricating agent; to provide bearings of this character which have constant friction characteristics under a substantially wide range of loads above a predetermined load; to provide a dry lubricating material of this kind from which may be conveniently eliminated at relatively little cost substantially all of the foreign matter that has a detrimental effect on the finished bearing structure; and to provide a dry lubricant in structures of this kind which will accomplish the foregoing results when present in exceedingly small proportions and which therefore need not be used in large enough quantities to materially reduce the metal-to-metal contact between the particles of the structure.

Further objects of the invention are the provision of a dry lubricating material in structures formed from compressed and sintered particles of metal which has been subjected to a heat treatment at a temperature substantially above or as high as that of the sintering operation and which therefore will not undergo swelling or other changes injurious to the finished product during such sintering operations; and to provide an improved method of making metal bearing structures from powdered materials by which improved structural strength, uniformity and bearing properties are obtainable.

A further object of the invention is the provision of a substantially silica-free expanded and exfoliated mica-like material which is obtainable from inexpensive raw materials without costly preparation and to provide a dry lubricant of this kind in articles formed from compressed powdered materials which is compatible with a large variety of such materials, particularly powdered metals.

An illustrative embodiment of the invention is shown in the accompanying drawing, in which.

In the manufacture of compressed articles from finely divided or powdered materials, particularly from powdered metals, there have been encountered numerous problems arising from the tendency of the particles of powdered materials to resist movement relative to each other during the compressing operation. In many instances, this characteristic of the particles of powdered materials results in greater compacting of the materials adjacent the opposite end portions of the article on which the compressing pressure is applied than throughout the zone intermediate these end portions. The resulting variation in density at diverse portions of the article is accompanied by a corresponding variation in strength and other physical characteristics. The foregoing conditions are exceptionally undesirable in porous metal bearing structures formed from powdered metals.

Previous attempts to provide in the mixtures of powdered materials from which articles are formed by compression alone, or by compression and a subsequent sintering operation have involved the use of powdered materials which have a detrimental effect upon the final product. In some cases, the solid lubricating agents used were required to be present in such large proportions that they seriously unfavorably affected the structural strength, anti-friction and wear-resisting properties of the resulting articles. In other cases, where the compressed powdered material is subjected to a sintering operation, the solid lubricants heretofore used underwent changes at the sintering temperature, such as expansion or shrinkage, which weakened or otherwise detrimentally affected the finished article. In substantially all instances, the solid lubricants heretofore used in mixtures of powdered materials for the foregoing purposes contained undesirable impurities and foreign matter which could not conveniently be removed.

I have found that a mineral, known as vermiculite, when exfoliated and reduced to a powdered form provides a highly satisfactory agent for facilitating relative movement of particles of powdered materials during compression thereof to a briquette of desired shape. The product resulting from the following treatment of vermiculite also serves as a dry lubricant in the finished product in bringing the frictional properties thereof to a desired condition.

Figure 1:
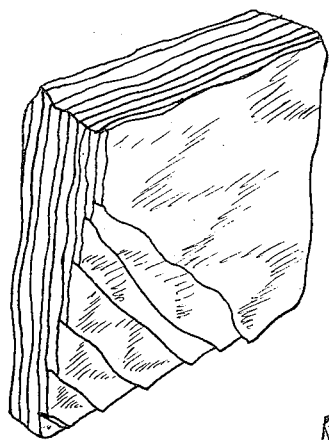
Fig. 1 is a fragmentary, perspective view representing a piece of vermiculite in the condition in which it is found as a mineral.
Figure 2:
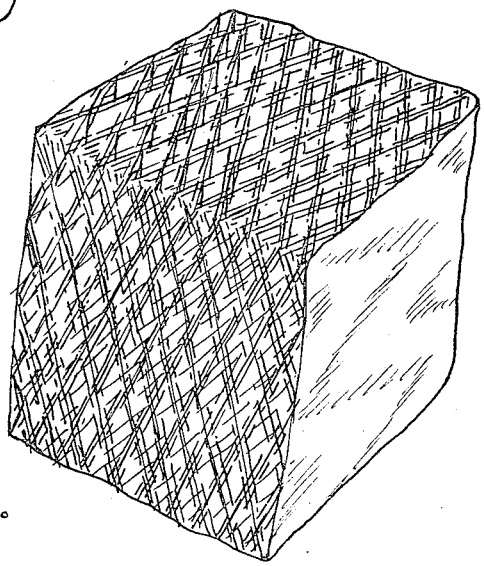
Fig. 2 is a diagrammatic perspective view showing the condition of the piece of vermiculite illustrated in Fig. 1, after the raw mineral has been expanded and exfoliated by heat treatment.

Vermiculite is, as illustrated in Fig. 1, a laminated crystalline structure of a mica-like nature which contains substantially from 7% to 9% of chemically combined moisture. When this mineral is suddenly heated to a relatively high temperature, from 1800° F. to 2,000° F., for example, the chemically combined moisture is removed and the mineral itself is expanded to an exfoliated state of fragile cellular form, as illustrated in Fig. 2. Exfoliated vermiculite may be readily reduced to a very finely divided powder in a hammer mill or other suitable apparatus. The resulting powdered product may be freed from silica and other undesirable contents by a flotation separation process during which the exfoliated vermiculite floats on the surface of a water or other suitable liquid bath and the impurities settle out in the bath. The individual particles of the resulting powdered exfoliated vermiculite, though of very small dimensions, remain in a flake-like condition and when mixed with the powdered materials provide loose slip plates. Subsequent heat treatment of such particles to, or substantially beyond, the temperature of the exfoliating heat treatment produces no appreciable change in the size or properties of the particles. These flake-like, minute particles of exfoliated vermiculite, though present in a mixture of powdered materials in only a relatively small proportion, effectively serve as a vehicle to accommodate flow-like shifting of the particles of powdered material during compression thereof to desired shapes. The shifting movement of the particles of powdered materials during compression thereof results in the attainment of uniform density throughout the resulting product, uniform porosity when a porous structure is being formed and uniform structural properties.

Figure 3:
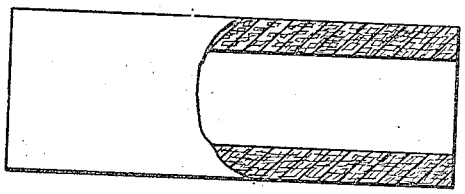
Fig. 3 is a side elevational view, partly in section, representing a structure, such as a bearing, formed from compressed, finely divided materials and embodying the invention.

While the improved flow-promoting and dry lubricating agent resulting from the foregoing treatment of vermiculite may be advantageously employed in the manufacture of articles from numerous different types of powdered materials, it is particularly useful in the manufacture of porous metal structures of the character used for bearing and other purposes and which are formed by compression and subsequent sintering of one or more powdered metals. The following are examples of a powdered metal composition embodying the invention which are particularly suitable for the manufacture of porous metal structures such as bearings of which Fig. 3 is an illustration.

1.

| | Per cent by weight |
|---|---|
| Copper | 25 |
| Iron | 73½ |
| Exfoliated vermiculite | ½ |
| Filler | 1 |

2.

| | Per cent by weight |
|---|---|
| Copper | 88¼ |
| Tin | 10 |
| Exfoliated vermiculite | ¾ |
| Filler | 1 |

The filler may comprise boric acid, stearic acid, calcium stearate, salicylic or similar organic or inorganic powdered material.

The foregoing mixtures of powdered materials are compressed in suitable dies to a desired shape and the resulting briquette is removed from the dies and sintered, preferably in a non-oxidizing or reducing atmosphere. The sintering temperature employed varies in accordance with the melting point of powdered metals, a temperature of substantially 1550° F. being suitable for the mixture of powdered copper and tin and a temperature of 1900° F. being suitable for a mixture containing powdered copper and powdered iron.

Bearing structures formed in the foregoing manner may be impregnated with lubricant by immersing them while hot in a suitable oil or other lubricant bath. It is found that metal structures made from powdered metal either for bearing or other purposes are uniform in density, strength and other physical properties when relatively small percentages of vermiculite are present. Exfoliated vermiculite is light in weight and may be employed in various quantities depending upon the purpose for which the final product is intended, it being preferable, particularly in bearing structures, to use from one-fourth to one per cent by weight thereof. The dry lubricating properties of vermiculite and the effect thereof in the manufacture of porous metal bearing structures causes the latter to have friction characteristics which depart materially from the corresponding characteristics of porous bearing metals in which vermiculite is not employed, for example, the frictional resistance offered by bearings made in accordance with the invention rapidly increases to a maximum under increasing loads and thereafter remains constant at its maximum value as the load is further increased. When graphite, for example, is employed in porous metal bearing structures, the friction increases proportionally, substantially in a straight line function as the load increases.

In the preparation of vermiculite and the conversion thereof to exfoliated form, it is preferably heated to a temperature slightly above the sintering temperature to which it will be subjected in sintering powdered metal containing articles.

Although but several specific embodiments of the invention are herein set forth, it will be understood that various changes and modifications in the illustrated application may be effected without departing from the spirit of the invention.

What I claim is:

1. An article comprising a compressed and sintered mass of powdered metal having distributed substantially throughout from one-fourth to one per cent by weight of finely divided particles of vermiculite from which chemically combined moisture has been removed by heat treatment.

2. Porous bearing metal comprising a compressed and sintered mass of powdered metal, and a dry lubricant distributed throughout said mass comprising finely divided particles of expended substantially anhydrous vermiculite from which chemically combined moisture has been suddenly removed by heat treatment at a temperature above the sintering temperature of said mass.

3. Porous bearing metal comprising a compressed and sintered mass of powdered metal, and a dry lubricant distributed throughout said mass comprising finely divided particles of exfoliated vermiculite.

4. A composition for the manufacture of compressed and sintered powdered metal comprising articles including a mixture of powdered metal, and finely divided particles of exfoliated vermiculite distributed throughout said powdered metal and providing loose slip plates for accommodating flow-like orientation of said metal particules during compression thereof.

5. A composition for the manufacture of compressed and sintered powdered metal comprising articles including a mixture of at least two metals having different melting points, the powdered metal of lower melting point constituting the minor portion by weight of said mixture and the powdered metal of higher melting point constituting the major portion by weight of said mixture and a comparatively small amount of dry lubricant comprising finely divided particles of vermiculite which has been exfoliated at a temperature above the sintering temperature of said metals.

6. The method of forming an article of manufacture which comprises mixing together powdered metal particles and a dry lubricant comprising finely divided particles of exfoliated vermiculite which has been heat treated to a temperature above the sintering temperature of said powdered metal, compressing said mixture to a briquette of desired shape while said lubricant accommodates shifting of said metal particles, and sintering said briquette.

7. The method of forming from powdered metals having different melting points a compressed and sintered article of manufacture which comprises heating a charge of vermiculite to an expanded and exfoliated substantially anhydrous state by subjecting said vermiculite to heat treatment at a temperature substantially as high as the sintering temperature of said metals, reducing said exfoliated vermiculite to a powdered state, mixing the resulting powdered exfoliated vermiculite with powdered metals having different melting points, compressing said mixture to a briquette of a desired shape, and sintering said briquette in a non-oxidizing atmosphere at a temperature between the melting points of said powdered metals.

8. An improved mixture for forming porous metal articles comprising a mixture of powdered metals of different melting points, the powdered metal of lower melting point constituting the minor proportion by weight of said mixture and the powdered metal of higher melting point constituting the major portion by weight of said mixture, and a relatively small amount of solid lubricant comprising exfoliated mica.

CHILD HAROLD WILLS.